(12) United States Patent
Heckendorf et al.

(10) Patent No.: US 8,792,332 B2
(45) Date of Patent: Jul. 29, 2014

(54) IMPLEMENTING LANE SHUFFLE FOR FAULT-TOLERANT COMMUNICATION LINKS

(75) Inventors: Ryan Abel Heckendorf, Rochester, MN (US); Kerry Christopher Imming, Rochester, MN (US); John David Irish, Rochester, MN (US); Ibrahim Abdel-Rahman Ouda, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/884,389

(22) Filed: Sep. 17, 2010

(65) Prior Publication Data

US 2012/0069729 A1    Mar. 22, 2012

(51) Int. Cl.
  *H04L 12/26* (2006.01)
  *H04W 24/08* (2009.01)
  *H04W 24/00* (2009.01)
  *H04W 28/04* (2009.01)

(52) U.S. Cl.
  CPC ............ *H04L 12/2602* (2013.01); *H04W 24/08* (2013.01); *H04W 24/00* (2013.01); *H04W 28/04* (2013.01)
  USPC ......................................................... 370/217

(58) Field of Classification Search
  None
  See application file for complete search history.

(56) References Cited

U.S. PATENT DOCUMENTS

| | | | |
|---|---|---|---|
| 4,654,841 A | 3/1987 | Ekberg | |
| 6,970,435 B1 * | 11/2005 | Buchanan et al. | 370/278 |
| 7,382,790 B2 | 6/2008 | Warren et al. | |
| 7,447,146 B2 * | 11/2008 | Goldberg et al. | 370/216 |
| 2004/0085994 A1 | 5/2004 | Warren et al. | |

OTHER PUBLICATIONS

U.S. Appl. No. 12/884,547, by Ryan Abel Heckendorf et al., entitled "Implementing Exchange of Failing Lane Information for Fault-Tolerant Communication Links", filed Sep. 17, 2010.
Ryan Abel Heckendorf et al., entitled "Implementing Exchange of Failing Lane Information for Fault-Tolerant Communication Links", filed on Sep. 17, 2010.

* cited by examiner

*Primary Examiner* — Ian N Moore
*Assistant Examiner* — Brian T Le
(74) *Attorney, Agent, or Firm* — Joan Pennington

(57) ABSTRACT

A method and circuit for implementing lane shuffle for fault-tolerant communication links, and a design structure on which the subject circuit resides are provided. Shuffle hardware logic steers a set of virtual data lanes onto a set of physical optical lanes, steering around all lanes that are detected as bad during link initialization training. A mask status register is loaded with a mask of lane fail information during link training, which flags the bad lanes, if any. The shuffle hardware logic uses a shift template, where each position in the starting template is a value representing the corresponding lane position. The shift template is cascaded through a set of shifters controlled by the fail mask.

14 Claims, 5 Drawing Sheets

200

| | LANES PER DATA LINK |
|---|---|
| PHYSICAL | 12 |
| NORMAL | 10 |
| DEGRADED | 9,8 |
| MINIMUM | 8 |

FIG. 2

IMPLEMENTING LANE SHUFFLE FOR FAULT-TOLERANT COMMUNICATION LINKS

This invention was made with Government support under Contract No. HR0011-07-9-0002 awarded by the Department of Defense. The Government has certain rights in this invention.

FIELD OF THE INVENTION

The present invention relates generally to the data processing field, and more particularly, relates to a method and circuit for implementing lane shuffle for fault-tolerant communication links, and a design structure on which the subject circuit resides.

DESCRIPTION OF THE RELATED ART

Some bus interfaces provide continued operation after a bit lane fails, where a bus, or link, is made up of a number of bit lanes, but known bus interface arrangements typically support only a limited subset of configurations.

Today one system has a requirement to continue operating with all remaining available lanes independent of which lanes are bad. Some links could have spare lanes available such that some failing lanes could be shuffled around without a loss in link bandwidth.

Implementing lane shuffle may appear to be a trivial problem; for example, where you count the number of bad lanes to the left of your position and then shift the correct lane into that position. This works for single fails or consecutive fails, but breaks down under some multiple error cases. For example, the following illustrates a non-trivial failing scenario.

| LANE:      | 0  | 1  | 2  | 3  | 4  | 5  | 6  | 7  | 8  | 9  | 10 | 11 |
|------------|----|----|----|----|----|----|----|----|----|----|----|----|
| fail mask: | 0  | 0  | 1  | 0  | 1  | 0  | 0  | 0  | 0  | 0  | 0  | 0  |
| Offset:    | +0 | +0 | +1 | +1 | +2 | +2 | +2 | +2 | +2 | +2 | x  | x  |
| Select:    | 0  | 1  |    | 3  | 4* | 6  | 7  | 8  | 9  | 10 | 11 |    |

Lanes are shifted to the left (toward zero) to create a set of lanes to be used on the link. As shown, lane 3 selects the data for lane 4 to steer into its slot, but lane 4 is also bad. The steering logic must consider fails to both the left and right.

A need exists for an effective mechanism for implementing lane shuffle for fault-tolerant communication links. It is desirable to provide such mechanism for implementing lane shuffle for fault-tolerant communication links that is a hardware-efficient arrangement.

SUMMARY OF THE INVENTION

Principal aspects of the present invention are to provide a method and circuit for implementing lane shuffle for fault-tolerant communication links, and a design structure on which the subject circuit resides. Other important aspects of the present invention are to provide such method and circuit substantially without negative effects and that overcome many of the disadvantages of prior art arrangements.

In brief, a method and circuit for implementing lane shuffle for fault-tolerant communication links, and a design structure on which the subject circuit resides are provided. Shuffle hardware logic steers a set of virtual data lanes onto a set of physical optical lanes. The shuffle hardware logic includes a status register storing a fail mask. The fail mask identifying bad lanes and the shuffle hardware logic steering around all bad lanes using the fail mask.

In accordance with features of the invention, the lanes are detected as bad during link initialization training. A mask status register is loaded with the mask of lane fail information during link training, which flags the bad lanes, if any.

In accordance with features of the invention, the shuffle hardware logic is implemented within the optical link interface. The shuffle hardware logic includes a plurality of multiplexers, each receiving a shift value.

In accordance with features of the invention, the shuffle hardware logic includes a shift template, where each position in the starting template is a value representing the corresponding lane position. The shift template is then cascaded through a set of shifters controlled by the fail mask.

In accordance with features of the invention, the output of a set of shifters provides a value for each lane position, which indicates the source lane for that position.

In accordance with features of the invention, the shuffle hardware logic handles all combinations of bad lanes, overcoming the limitation of existing arrangements that typically support only a limited subset of configurations.

In accordance with features of the invention, the output of the shuffle hardware logic is a set of consecutive good lanes. This steering is done on both the transmit and receive ends of the fault-tolerant optical communication links.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 illustrates an example 'lanes per link' summary for fault-tolerant communication links in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and a circuit for implementing lane shuffle for fault-tolerant communication links, and a design structure on which the subject circuit resides are provided.

Figure 1:
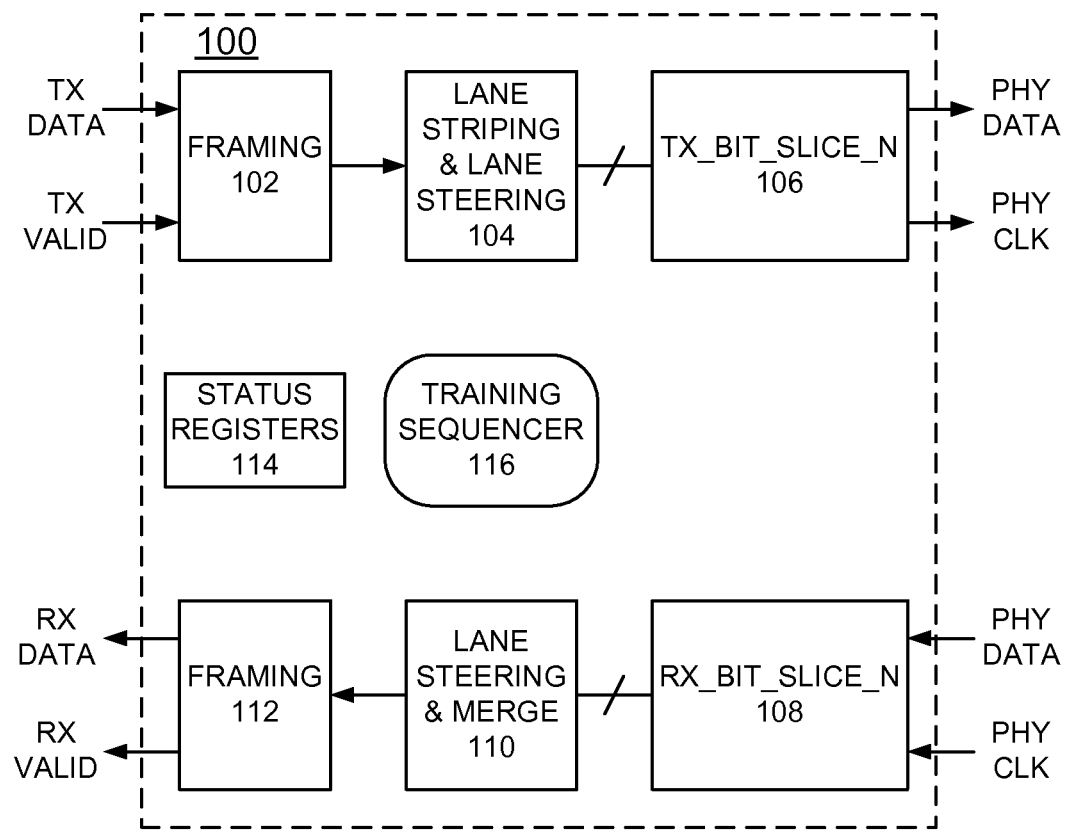
FIG. 1 is a block diagram representation illustrating a circuit for implementing lane shuffle for fault-tolerant communication links in accordance with the preferred embodiment.

Having reference now to the drawings, in FIG. 1, there is shown an example circuit generally designated by the reference character 100 for implementing lane shuffle for fault-tolerant communication links in accordance with the preferred embodiment. Circuit 100 is an optical link layer (OLL) unit for implementing lane shuffle to avoid bad lanes between a transmitter and a receiver attached to fault-tolerant optical communication links in accordance with the preferred embodiment.

Circuit 100 includes a framing block 102 receiving transmit TX data and TX valid inputs coupled to a lane striping and lane steering block 104 coupling serial transmit slices (TX_BIT_SLICE_N) 106 providing serial slices to a parallel bus indicated by PHY DATA, and PHY CLK. Circuit 100 includes serial receive slices (RX_BIT_SLICE_N) 108 receiving data from the parallel bus indicated by PHY DATA, and PHY CLK. A lane steering and merge block 110 couples serial receive slices to a framing block 112. Circuit 100 includes status registers 114 for storing lane mask information, and a training sequencer 116 for implementing link training processes in accordance with the preferred embodiment. The lane mask information stored in a fail mask in status registers 114 identifies bad lanes, which are identified during link training.

Referring also to FIG. 2, there is shown an example 'lanes per link' summary generally designated by the reference character 200 for fault-tolerant communication links in accordance with the preferred embodiment. For example, each physical link can include 12 lanes per data link including normal mode operation of 10 lanes per data link. Degraded mode operation includes 8 or 9 lanes per data link, with a minimum of 8 lanes per data link.

Figure 3:
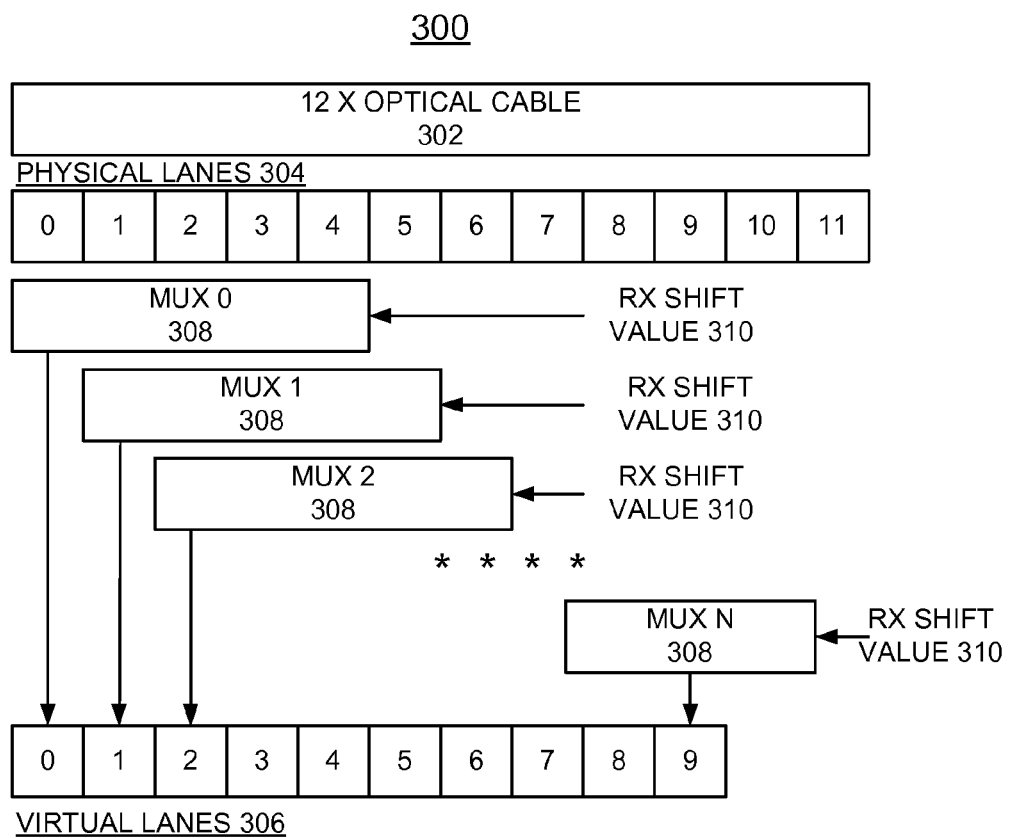
FIG. 3 illustrates an example physical-to-virtual lane steering with lane shuffle logic of the circuit of FIG. 1 for implementing lane shuffle for fault-tolerant communication links in accordance with the preferred embodiment.

Referring to FIG. 3, there is shown example physical-to-virtual lane steering with lane shuffle logic generally designated by the reference character 300 of the circuit 110 of the circuit 100 for implementing lane shuffle for fault-tolerant communication links in accordance with the preferred embodiment. The physical-to-virtual lane steering with lane shuffle logic 300 includes an optical cable 302, such as a 12-lane optical cable, having physical lanes 304, 0-11 steering to a maximum of 10 virtual lanes 306, 0-10. A plurality of multiplexers 308, #0-N, each receiving a respective RX shift value 310 implement the physical-to-virtual lane steering.

Figure 4:
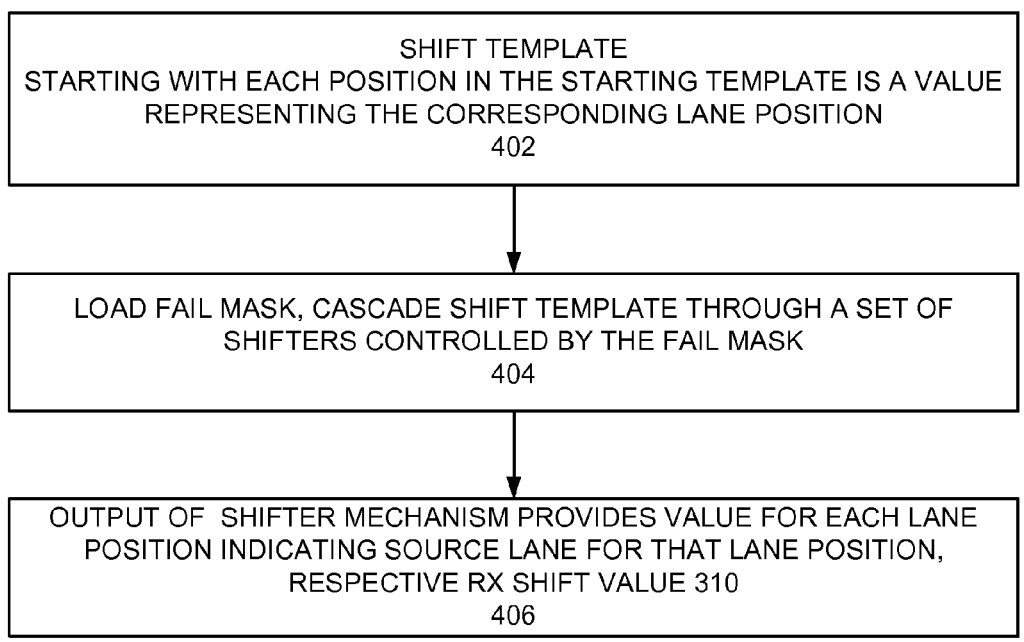
FIG. 4 illustrates an example lane shuffle logic of the circuit of FIG. 1 for implementing lane shuffle for fault-tolerant communication links in accordance with the preferred embodiment.

Referring to FIG. 4, there is shown example lane shuffle logic generally designated by the reference character 400 of the circuit 100 for implementing lane shuffle for fault-tolerant communication links in accordance with the preferred embodiment. Lane shuffle logic 400 includes a shift template, starting where each position in the starting template is a value representing the corresponding lane as indicated at a block 402. This template is then cascaded through a set of shifters controlled by the fail mask as indicated at a block 404. The output of this shift mechanism is then a value for each lane position, for example, providing the respective RX shift values 310, which indicates the source lane for that position as indicated at a block 406.

This implementation allows for up to four bad lanes, while it should be understood that the invention could be expanded to support more bad lanes. For each lane slot the lane position values are then used to select from up to five possible sources, the direct mapped lane or one of up to four lanes to the right. Multiplexers at the right side of the link have fewer data sources.

This invention handles all combinations of bad lanes, overcoming the limitation of existing solutions that typically support only a limited subset of configurations. The output of the logic is a set of consecutive good lanes that is delivered to the next logic. This steering is done on both the transmit and receive ends.

Example Lane Shuffle Shift Template, Logic Operations

A template is formed with a value indicating each lane position

```
constant shift_template :=
                "0000" & "0001" & "0010" & "0011" & "0100" & "0101" &
                "0110" & "0111" & "1000" & "1001" & "1010" & "1011";
-- The number of useable lanes is computed by counting the number of '0' bits in
-- the receive mask (rx_mask)
rx_lanes_avail        <= bitwise_count( '0', rx_mask );
-- Maximum number of lanes is 10. Values greater than 10 are reduced back
-- to 10.
with rx_lanes_avail select
     rx_lanes_nxt <= "1010"           when "1011" | "1100",
                     rx_lanes_avail   when OTHERS;
-- The template is shifted based on the virtual lane mask (rx_maskv)
-- The rx_shift_stgN value for each lane will represent the PHYSICAL lane that
-- should be used for this lane position
rx_shift_stg11 <= "0000"                           when rx_maskv(11) = '1' else
                    shift_template(11*4 to 11*4+3);
rx_shift_stg10 <= rx_shift_stg11 & "0000"         when rx_maskv(10) = '1' else
                    shift_template(10*4 to 10*4+3) & rx_shift_stg11;
rx_shift_stg9 <=rx_shift_stg10 & "0000"           when rx_maskv(9) = '1' else
                    shift_template(9*4 to 9*4+3)  & rx_shift_stg10;
rx_shift_stg8 <= rx_shift_stg9 & "0000"           when rx_maskv(8) = '1' else
                    shift_template(8*4 to 8*4+3)  & rx_shift_stg9;
rx_shift_stg7 <= rx_shift_stg8 & "0000"           when rx_maskv(7) = '1' else
                    shift_template(7*4 to 7*4+3)  & rx_shift_stg8;
rx_shift_stg6 <= rx_shift_stg7 & "0000"           when rx_maskv(6) = '1' else
                    shift_template(6*4 to 6*4+3)  & rx_shift_stg7;
rx_shift_stg5 <= rx_shift_stg6 & "0000"           when rx_maskv(5) = '1' else
                    shift_template(5*4 to 5*4+3)  & rx_shift_stg6;
rx_shift_stg4 <= rx_shift_stg5 & "0000"           when rx_maskv(4) = '1' else
                    shift_template(4*4 to 4*4+3)  & rx_shift_stg5;
rx_shift_stg3 <= rx_shift_stg4 & "0000"           when rx_maskv(3) = '1' else
                    shift_template(3*4 to 3*4+3)  & rx_shift_stg4;
rx_shift_stg2 <= rx_shift_stg3 & "0000"           when rx_maskv(2) = '1' else
                    shift_template(2*4 to 2*4+3)  & rx_shift_stg3;
```

```
rx_shift_stg1 <= rx_shift_stg2 & "0000"        when rx_maskv(1) = '1' else
                 shift_template(1*4 to 1*4+3)  & rx_shift_stg2;
rx_shift_stg0 <= rx_shift_stg1 & "0000"        when rx_maskv(0) = '1' else
                 shift_template(0*4 to 0*4+3)  & rx_shift_stg1;
-- Due to critical logic delay/timing paths, latch the outputs of the shift computation.
-- Changes in RX_MASK require up to 2 cycles to propagate to correct lane count
-- _nxt is the data input to the latch, the _l2 output will be valid in the next clock cycle
rx_shift0_nxt <= rx_shift_stg0( 0 to 3);
rx_shift1_nxt <= rx_shift_stg0( 4 to 7);
rx_shift2_nxt <= rx_shift_stg0( 8 to 11);
rx_shift3_nxt <= rx_shift_stg0(12 to 15);
rx_shift4_nxt <= rx_shift_stg0(16 to 19);
rx_shift5_nxt <= rx_shift_stg0(20 to 23);
rx_shift6_nxt <= rx_shift_stg0(24 to 27);
rx_shift7_nxt <= rx_shift_stg0(28 to 31);
rx_shift8_nxt <= rx_shift_stg0(32 to 35) when
                 (rx_lanes_l2 = "1001") OR (rx_lanes_l2 = "1010") else "1111";
rx_shift9_nxt <= rx_shift_stg0(36 to 39) when
                 (rx_lanes_l2 = "1010") else "1111";
-- Select the correct PHYSICAL lane to map onto each of the 10 internal lanes.
-- rx_vlane are the VIRTUAL input lanes
-- Each lane has five possible sources to handle all of the cases involving up to four
-- bad lanes. Note the PAD symbols are inserted onto bad lanes if the good lane
-- count falls below 10. Also note that each rx_lane and rx_vlane signal is a vector
-- of 9 bits representing a lane of data
with rx_shift0_l2 select rx_lane(0)   <=    rx_vlane(0) when "0000",
                                            rx_vlane(1) when "0001",
                                            rx_vlane(2) when "0010",
                                            rx_vlane(3) when "0011",
                                            rx_vlane(4) when others;
with rx_shift1_l2 select rx_lane(1)   <=    rx_vlane(1) when "0001",
                                            rx_vlane(2) when "0010",
                                            rx_vlane(3) when "0011",
                                            rx_vlane(4) when "0100",
                                            rx_vlane(5) when others;
with rx_shift2_l2 select rx_lane(2)   <=    rx_vlane(2) when "0010",
                                            rx_vlane(3) when "0011",
                                            rx_vlane(4) when "0100",
                                            rx_vlane(5) when "0101",
                                            rx_vlane(6) when others;
with rx_shift3_l2 select rx_lane(3)   <=    rx_vlane(3) when "0011",
                                            rx_vlane(4) when "0100",
                                            rx_vlane(5) when "0101",
                                            rx_vlane(6) when "0110",
                                            rx_vlane(7) when others;
with rx_shift4_l2 select rx_lane(4)   <=    rx_vlane(4) when "0100",
                                            rx_vlane(5) when "0101",
                                            rx_vlane(6) when "0110",
                                            rx_vlane(7) when "0111",
                                            rx_vlane(8) when others;
with rx_shift5_l2 select rx_lane(5)   <=    rx_vlane(5) when "0101",
                                            rx_vlane(6) when "0110",
                                            rx_vlane(7) when "0111",
                                            rx_vlane(8) when "1000",
                                            rx_vlane(9) when others;
with rx_shift6_l2 select rx_lane(6)   <=    rx_vlane(6 ) when "0110",
                                            rx_vlane(7 ) when "0111",
                                            rx_vlane(8 ) when "1000",
                                            rx_vlane(9 ) when "1001",
                                            rx_vlane(10) when "1010",
                                            SYM_PAD when others;
with rx_shift7_l2 select rx_lane(7)   <=    rx_vlane(7 ) when "0111",
                                            rx_vlane(8 ) when "1000",
                                            rx_vlane(9 ) when "1001",
                                            rx_vlane(10) when "1010",
                                            rx_vlane(11) when "1011",
                                            SYM_PAD when others;
with rx_shift8_l2 select rx_lane(8)   <=    rx_vlane(8 ) when "1000",
                                            rx_vlane(9 ) when "1001",
                                            rx_vlane(10) when "1010",
                                            rx_vlane(11) when "1011",
                                            SYM_PAD when others;
with rx_shift9_l2 select rx_lane(9)   <=    rx_vlane(9 ) when "1001",
                                            rx_vlane(10) when "1010",
                                            rx_vlane(11) when "1011",
                                            SYM_PAD when others;
```

In brief, the invention provides a hardware-efficient solution to calculate the lane steering to shift past the failing lanes while avoiding any additional bad lanes to the right. The 12-lane case is shown here, but similar solutions exist for other numbers of lanes.

Figure 5:
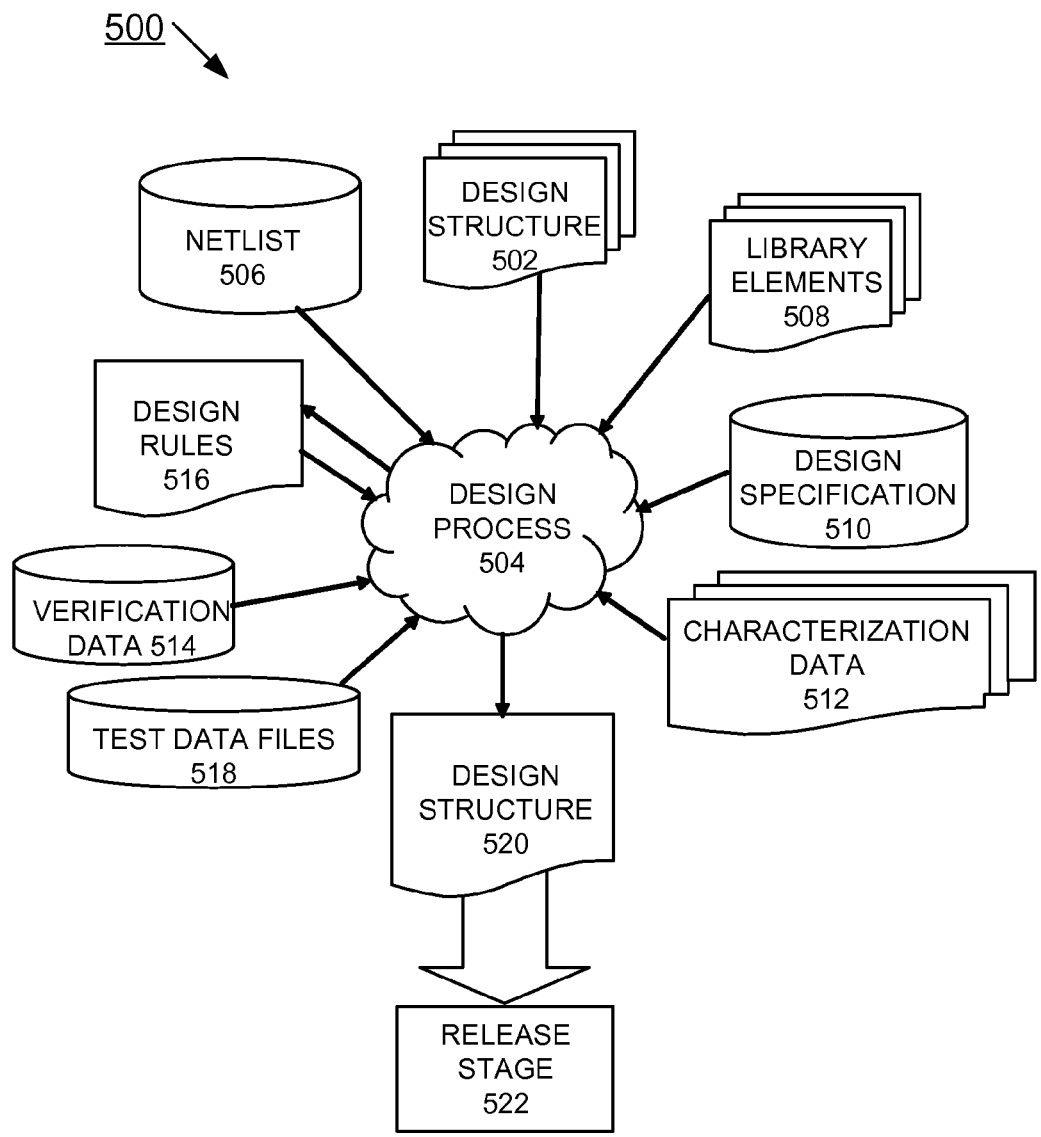
FIG. 5 is a flow diagram of a design process used in semiconductor design, manufacturing, and/or test.

FIG. 5 shows a block diagram of an example design flow 500. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuit 100 in the form of schematics or HDL, a hardware-description language, for example, Verilog, VHDL, C, and the like. Design structure 502 may be contained on one or more machine readable medium. For example, design structure 502 may be a text file or a graphical representation of circuit 100. Design process 504 preferably synthesizes, or translates, circuit 100, and circuit 300 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuit.

Design process 504 may include using a variety of inputs; for example, inputs from library elements 508 which may house a set of commonly used elements, circuits, and devices, including models, layouts, and symbolic representations, for a given manufacturing technology, such as different technology nodes, 32 nm, 45 nm, 90 nm, and the like, design specifications 510, characterization data 512, verification data 514, design rules 516, and test data files 518, which may include test patterns and other testing information. Design process 504 may further include, for example, standard circuit design processes such as timing analysis, verification, design rule checking, place and route operations, and the like. One of ordinary skill in the art of integrated circuit design can appreciate the extent of possible electronic design automation tools and applications used in design process 504 without deviating from the scope and spirit of the invention. The design structure of the invention is not limited to any specific design flow.

Design process 504 preferably translates an embodiment of the invention as shown in FIGS. 1, 2, 3 and 4 along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 1, 2, 3 and 4. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing lane shuffle for fault-tolerant communication links comprising:
   providing shuffle hardware logic,
   steering, by said shuffle hardware logic, a set of data lanes onto a set of optical lanes,
   using a fail mask and steering, by said shuffle hardware logic around detected bad lanes,
   providing a shift template with said shuffle hardware logic, where each position in a starting shift template is a value representing a corresponding lane position; and
   cascading said shift template through a set of shifters controlled by the fail mask.

2. The method as recited in claim 1 includes loading a mask status register with lane mask information from the fail mask during link training.

3. The method as recited in claim 1 includes learning lane mask information during link training.

4. The method as recited in claim 1 includes using said shuffle hardware logic to connect to optical links for preventing unauthorized connection to the optical links.

5. A circuit for implementing lane shuffle for fault-tolerant communication links comprising:
   shuffle hardware logic, said shuffle hardware logic steering a set of data lanes onto a set of optical lanes,
   said shuffle hardware logic including a status register storing a fail mask, said fail mask identifying bad lanes,
   said shuffle hardware logic steering around identified bad lanes using said fail mask;
   said shuffle hardware logic including a shift template, where each position in a starting shift template is a value representing a corresponding lane position; and said shift template being cascaded through a set of shifters controlled by the fail mask.

6. The circuit as recited in claim 5 wherein said shuffle hardware logic is implemented within an optical link interface.

7. The circuit as recited in claim 5 wherein said shuffle hardware logic includes a plurality of multiplexers, each receiving a receive shift value.

8. The circuit as recited in claim 5 wherein an output of said set of shifters provides a value for each lane position, indicating a source lane for the lane position.

9. The circuit as recited in claim 5 wherein said shuffle hardware logic being used to connect to optical links, and preventing unauthorized connection to the optical links.

10. The circuit as recited in claim 5 include a training sequencer learning lane mask information in a link training process and storing the fail mask in said status register.

11. A design structure embodied in a non-transitory machine readable medium used in a design process, the design structure comprising:
   a circuit tangibly embodied in the non-transitory machine readable medium used in the design process, said circuit for implementing lane shuffle for fault-tolerant communication links, said circuit comprising:
   shuffle hardware logic, said shuffle hardware logic steering a set of data lanes onto a set of optical lanes,
   said shuffle hardware logic including a status register storing a fail mask, said fail mask identifying bad lanes, and
   said shuffle hardware logic steering around identified bad lanes using said fail mask,
   said shuffle hardware logic steering around identified bad lanes using said fail mask;

said shuffle hardware logic including a shift template, where each position in a starting shift template is a value representing a corresponding lane position; and said shift template being cascaded through a set of shifters controlled by the fail mask, the design structure, when read and used in a manufacture of a semiconductor chip produces a chip comprising said circuit.

12. The design structure of claim 11, wherein the design structure comprises a netlist, which describes said circuit.

13. The design structure of claim 11, wherein the design structure resides on storage medium as a data format used for exchange of layout data of integrated circuits.

14. The design structure of claim 11, wherein the design structure includes at least one of test data files, characterization data, verification data, or design specifications.

* * * * *